United States Patent [19]

Diggs

[11] Patent Number: 4,461,365
[45] Date of Patent: Jul. 24, 1984

[54] BICYCLE POWER PACK

[76] Inventor: Thomas M. Diggs, 1349 Otis St. NE., Washington, D.C. 20017

[21] Appl. No.: 332,727

[22] Filed: Dec. 21, 1981

[51] Int. Cl.³ ............................................. B62D 59/04
[52] U.S. Cl. ...................................... 180/11; 188/30; 280/204; 280/715
[58] Field of Search ................ 180/11, 14 A; 188/30, 188/31; 280/204, 715, 724, 725, 726, 697

[56] References Cited

U.S. PATENT DOCUMENTS

| | | | |
|---|---|---|---|
| 1,407,597 | 2/1922 | Smith | 180/11 |
| 2,188,328 | 1/1940 | Anderson et al. | 188/30 |
| 2,370,988 | 3/1945 | Neal | 280/204 |
| 2,552,846 | 5/1951 | Dinkins | 180/11 |
| 2,777,686 | 1/1957 | Giacosa et al. | 280/715 |
| 2,806,714 | 9/1957 | Scherenberg et al. | 280/715 |
| 2,822,879 | 2/1958 | Overton | 180/11 |
| 2,963,987 | 12/1960 | Cottrell | 280/724 |
| 3,312,299 | 4/1967 | Kuecker | 180/11 |
| 3,934,666 | 1/1976 | Ellington | 180/11 |

FOREIGN PATENT DOCUMENTS

| | | | |
|---|---|---|---|
| 869109 | 1/1942 | France | 180/11 |
| 915600 | 11/1946 | France | 180/11 |
| 241131 | 6/1946 | Switzerland | 280/204 |
| 7492 | 3/1906 | United Kingdom | 280/715 |

Primary Examiner—Joseph F. Peters, Jr.
Assistant Examiner—D. Lynn Fugate
Attorney, Agent, or Firm—Blair, Brown & Kreten

[57] ABSTRACT

A device for propelling a bicycle or the like comprising in combination, a frame having wheels and an overlying cargo carrier instrumentality, a power pack disposed thereon adapted to drive said wheels, hitching instrumentalities connecting said frame to the bicycle rearwardly thereof, and suspension instrumentalities disposed between said wheels and said frame whereby road irregularities and the like are absorbed by said suspension instrumentalities and in part by said hitching instrumentalities, said hitching instrumentalities providing the bicycle a complete normal range of motion.

10 Claims, 12 Drawing Figures

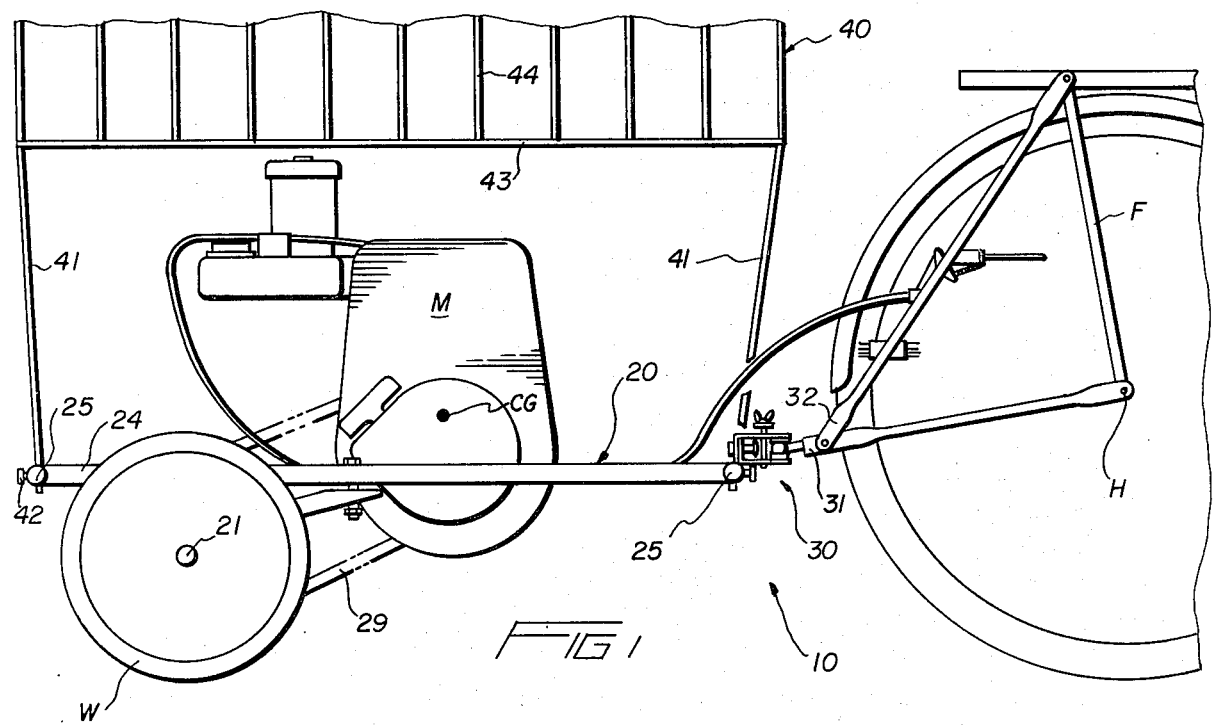
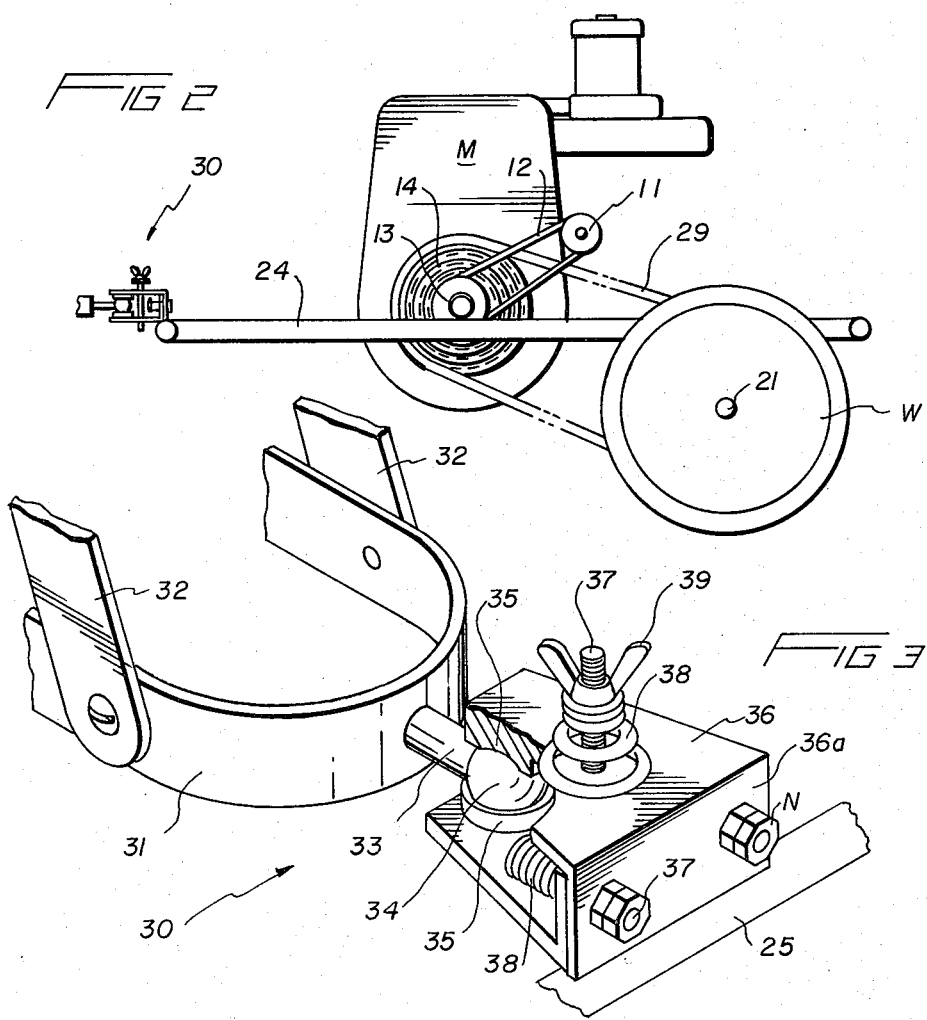

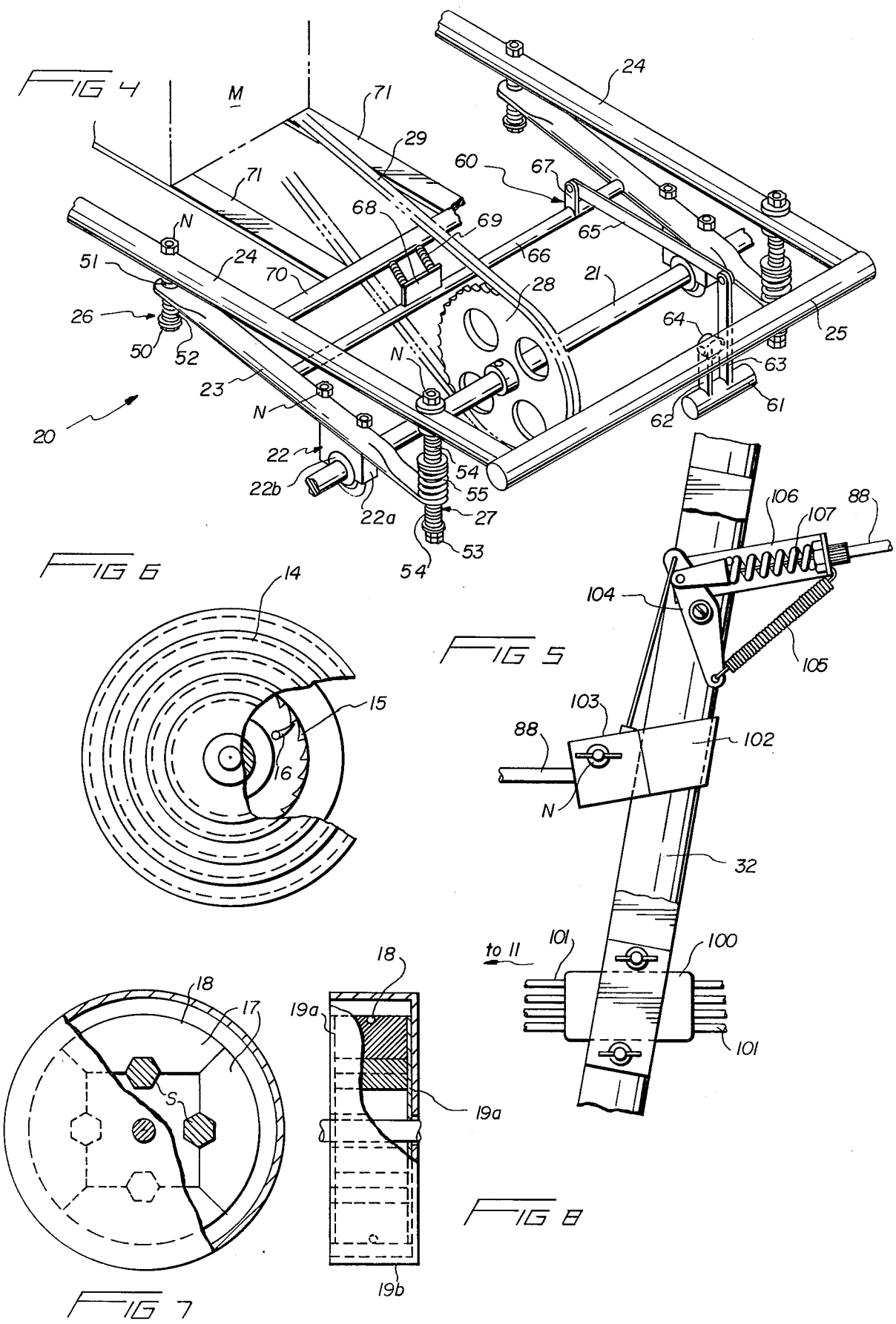

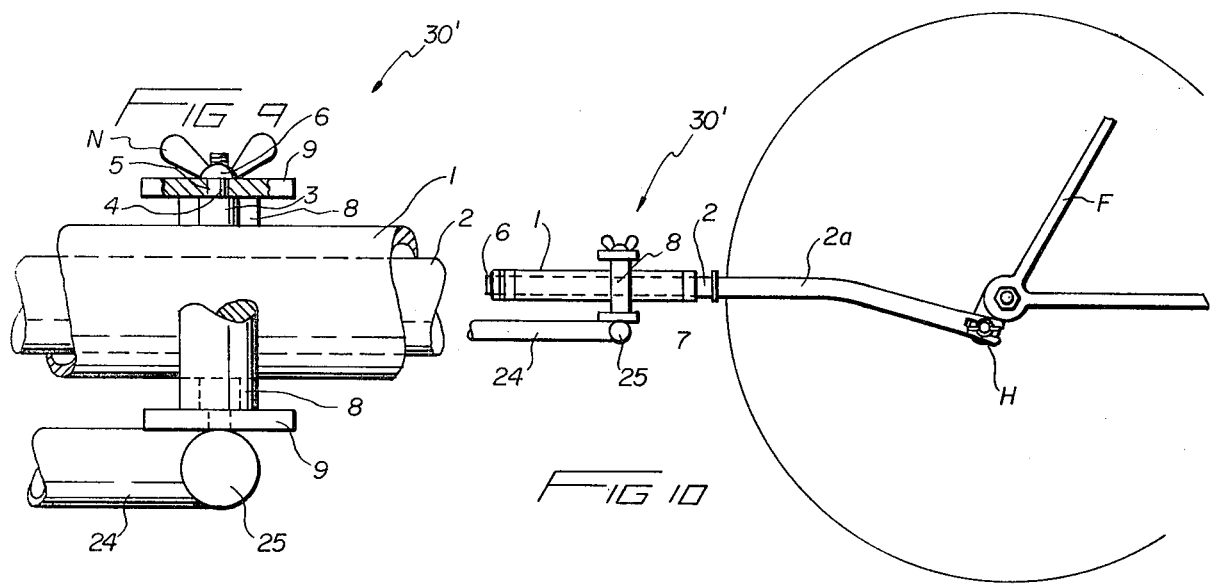
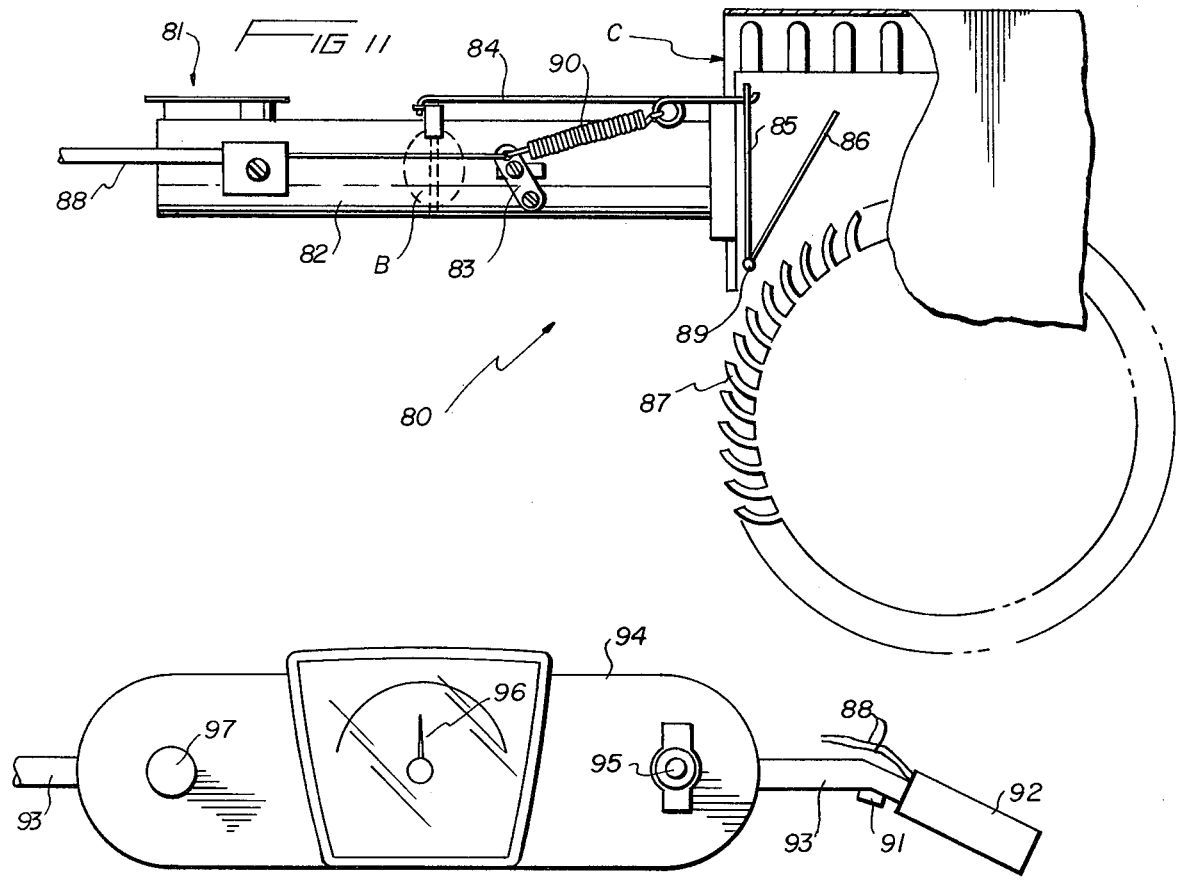

BICYCLE POWER PACK

BACKGROUND OF THE INVENTION

The following relates generally to power packs and cargo carriers for bicycles and the like.

It is clear that America's waste of natural resources can no longer continue. Public awareness has increased on this subject to the point where smaller vehicles of all descriptions have come into vogue, and the least energy intensive device which still provides efficient transportation is a bicycle. It is known in the prior art to provide bicycles with power packs or the like in order to assist the driver in going up steep grades or to compensate for other terrain difficul that propulsion units in which a trailer is hitched to the bicycle, problems may exist in stability during cornering or the like. In addition, power units of the second type do not always lend themselves to the ready disposition thereon of an article carrier so as to enhance and increase the versatility of the powered bicycle.

The follow patents reflect the state of the art of which applicant is aware insofar as these patents appear to be germane to the patent process:

| 1,407,597 | Smith | 2,822,879 | Overton |
| --- | --- | --- | --- |
| 2,552,846 | Dinkins, Jr. | 3,312,299 | Kuecker |

The patent to Smith is of great interest in that the attaching mechanism, while providing a connection from the propulsion unit to the bicycle that is relatively removable, does not allow the bicyclist to change his angle (lean) normally in respect to the riding surface when in a turn or curve so as to equalize the centrifugal and centripetal forces which assures an easy control and balance at all times. This of course is due to the rigid interconnection between the parcel carrying vehicle of Smith and the bicycle.

The Dinkins patent, while providing an interconnection between the bicycle and the power unit which is capable of articulation with degrees of freedom about two axes, has no suspension mechanism for the power unit, thereby causing impacts at higher speeds from an irregular surface to be transmitted from the power pack through to the bicycle, at a time when these disruptive forces are tranferred forwardly onto the bicycle area at a least propitious moment.

Similarly, while Kuecker teaches the use of a propelling unit, his single means of attachment to a side portion of the bicycle does not lend itself to stable turning in both directions, nor does the hitching mechanism allow for the bicycle to be placed on its side while the trailer unit is allowed to remain in an upright position. It is clear that unequal forces would be encountered in this device when turning in one direction compared to the other, and this device does not lend itself to leaning into curves with the same facility as the instant invention.

The remaining reference shows the state of the art further.

By way of contrast, the instant invention is distinguished over the prior art devices in that a hitching mechanism is provided which allows free movement around all three axis: vertical, horizontal, and longitudinal, and is unhampered by the load or total weight of the power pack. Moreover, the device according to the instant invention lends itself readily for the placement and carrying of a plurality of articles above the power pack area with no perceptible change in the handling characteristics of the bicycle, and to this end, an ingenious and highly effective triple coil spring suspension is provided for the power pack which in combination with a bicycle provides minimal transferal of shocks from irregular surface to be transmitted forwardly through to the driver. Thus, the hitching mechanism in combination with the suspension provides the ability to maneuver in close quarters and over rough terrain.

OBJECTS AND SUMMARY OF THE INVENTION

Accordingly, this invention has as an object to provide a device which has improved suspension means over that which the prior art would suggest.

A further object of this invention is to provide a device of the character described above which allows the bicycle to articulate relative to the power pack on the trailer so that the bicycle can lean into curves in a safe manner, and simultaneously allow good maneuverability of the bicycle and trailer in tight quarters and rough terrain.

It is still yet a further object of this invention to provide a device of the character described above which allows the disposition of articles on top of the trailer in such a manner that the stability of the bicycle and the power pack are not compromised.

It is still yet a further object of this invention to provide a device of the character described above which is extremely reliable and safe to use and durable in construction.

It is still yet a further object of this invention to provide a device of the character described above with the ability to articulate the power pack relative to the bicycle substantially.

It is a further object of this invention to provide a device of the character described above having improved braking means, as well as improved means for altering the relationship between torque and speed as by gears.

It is still yet a further object of this invention to provide a device in which the trailer supporting the power pack is in a locked mode when starting the engine which is supported thereon.

It is still yet a further object of this invention to provide an automatic governor for controlling the engine speed in combination with an override which allows propulsion by pedaling with the engine inoperative if so desired.

It is yet a further object of this invention to provide a device of the character described above in which plural accessories can be readily fitted thereon such as illumination means, electric start, turn signals, etc.

It is yet a further object of this invention to provide a device of the character described above in which the means for attaching the bicycle to the trailer provides three degrees of freedom about three axes.

These and other objects will be made manifest when considering the following detailed specification when taken in conjunction with the appended drawing figures wherein there is provided a trailer adapted to be attached to bicycle or other type of velocipede, the area of interconnection allowing complete range of motion of the bicycle relative to the trailer, the trailer including thereon a power pack adapted to be selectively engageable so that pedaling can be used as a primary mode of propulsion, the engine can be used or both used simultaneously, the frame supporting the engine adapted to receive thereon a cargo carrier which has no readily appreciable adverse effect on the stability of the device, the bicycle interconnected in a manner that speed control, safety illumination, speed indication and the like are readily available on a control area of the bicycle.

BRIEF DESCRIPTION OF THE DRAWING FIGURES

FIG. 1 is a side view of the apparatus according to the present invention.

FIG. 2 is an alternative side view remote from that which is shown in FIG. 1 with the carriage frame removed.

FIG. 3 is a perspective view of a first hitching mechanism connecting the bicycle to the trailer as shown in FIG. 1.

FIG. 4 is a perspective view of the suspension framework upon which the motor of the trailer resides.

FIG. 5 is an enlargement of a control linkage that extends between the bicycle and the trailer as shown in FIG. 1.

FIG. 6 is a partial sectional view of a ratchet clutching mechanism behind the plurality of sprockets shown in FIG. 2.

FIG. 7 is a partial section view of a centrifugal clutching mechanism behind the sprockets and the ratchet clutch as shown in FIG. 2.

FIG. 8 is a partial end/section view of that which is shown in FIG. 7.

FIG. 9 is a fragmentary side view of a portion of that which is shown in FIG. 10.

FIG. 10 shows an alternative second hitching mechanism to that which is shown in FIG. 3.

FIG. 11 provides a partial/sectional/side view of the governor according to the apparatus according to the present invention.

FIG. 12 shows a possible instrument panel associated with the handle bars of the bicycle.

DESCRIPTION OF THE PREFERRED EMBODIMENT

Referring to the drawings now wherein like reference numerals refer to like parts throughout the various drawing figures, reference numeral 10 of FIG. 1 refers to the bicycle power pack according to the present invention.

The bicycle power pack includes a frame 20 having a suspension means, a hitching area 30 for attachment to the bicycle proper, and a cargo carrier 40 to be defined hereinafter.

A motor M is adapted to be supported upon the frame 20 in such a manner that the motor's center of gravity is extremely low, it being noted that the hub H of the rear wheel of the bicycle in FIG. 1 is substantially higher than the center of gravity CG of the motor and moreover, the motor M is placed rearwardly in proximate relationship to a rear axle 21 as will be disclosed shortly so that there is substantially no turning moment at the hitching area 30, and substantially all the motor's weight is supported on the rear axle 21.

More specifically (FIG. 4), the rear axle 21 has at opposed extremities a pair of wheels W, suitably supported by bearings 22, the bearings 22 depending from a pair of swing arms 23 wherein each swing arm is disposed upon lower longitudinal side edges of the frame proper. Most specifically, the frame is formed with a pair of longitudinal braces 24 which are interconnected at opposed extremities by a pair of latitudinal braces 25 which together form a substantially rectangular framework. Opposed extremities of the two swing arms 23 are provided with spring means, the forward spring 26 cooperating with a special triple rear spring 27 so that the rear axle 21 can follow the contour of rough roads and the like with a minimal amount of displacement being transferred forwardly disrupting the balance and momentum of the bicycle driver. As shown in FIG. 4, the bearings include a pillow block 22a on a bottom face of the swing arm 23, a bearing race 22b disposed around the axle 21, and an inverted U-shaped clamp 22c extending through the pillow block and overlying the bearing race, the inverted U-shaped clamp passing through a top face of the swing arm and affixed thereto by a pair of nuts N as is well known in the art. Thus, shaft 21 is freely rotatable within the bearings 22. A sprocket 28 is provided having a chain 29 thereon, the sprocket 28 fixed to the shaft 21 so that the motor M can drive the shaft. The benefit of the flexible chain member of course is to allow the lower depending swing of arms 23 to travel according to the road contour while the upper frame 24, 25 is allowed to remain in a substantially horizontal plane, this major frame 24, 25 serving to support the motor which will be defined shortly. Structure of the forward spring arm spring 26 includes a bolt 50 extending through the swing arm 23 and the longitudinal brace 24, and having a nut N fixed thereon. Between the longitudinal brace 24 and the swing arm 23 a spacer 51 is provided, so as to provide a fulcrum or pivoting area, and the area between the swing arm 23 and an end portion of the bolt, a spring 52 is provided so that when displacement between the swing arm 23 and the longitudinal brace 24 occurs a cantilevered tensioning is provided by virtue of the biasing by spring 52 to cause the divergent end portion of the swing arm to come back into tangential contact with brace 24 within the limits of the spacer 51. The trailing end of the swing arm remote therefrom includes a further bolt 53 fastened through the swing arm and to the top face of the longitudinal brace 24 by a nut N, with the space between the swing arm 23 and the bolt head being occupied by a further spring 54, a similar bolt spring 54 extending on the bolt 53 and depending from the longitudinal brace 24, and a further damping means 55 interposed between the swing arm 23 and longitudinal brace 24. More specifically, the damping means 55 includes an elastomeric core and an outer spring having a greater spring constant than the previously discussed springs 54 so that when either or both of the springs 54 bottom out, the elastomeric core provides the next means for resilient absorption and dissipation of the load in combination with the outer thickened spring, so as to provide a gradation and continuum of shock absorption based on the degree of compression and need. Therefore, a graduated suspension system capable of dynamically changing its ability to react to surface irregularities in the road has been provided.

Another feature of the frame 20 is evident in FIG. 4, and includes a brake means 60 for use in locking the sprocket 28, axle 21, and drive wheels W from rotation when attempting maintenance, starting of the engine, or other forms of manipulation in which it is desired that the wheeled frame is completely disabled from motion. A handle 61 is provided with a first pivot point and lever 62 and a longer lever 63, first lever 62 pivotally supported upon the latitudinal brace 25 at the rearmost extremity of the frame through an intermediary piece 64. The longer pivot lever 63 has an end remote from the handle 61 that communicates through a link 65 to a transverse shaft 66, parallel to the latitudinal braces 25, which is freely rotatable in the swing arms 23. The transverse shaft 66 is pivotally connected to the link 65 through upstanding tab member 67 as shown in FIG. 4. The sprocket 28 is in longitudinal registry with a brake block 68, mounted on the transverse shaft 66, the brake block serving to rotate forwardly in response to motion of the handle 61 so that when the brake block 68 engages between teeth on the sprocket 28, the rotation of the sprocket and therefore motion of the wheels has been effectively retarded. The brake block 68 is biased by means of springs 69 attached to one of the two motor support rods 70 so that upon release of pressure against the handle as by foot pressure, hand pressure or the like, the brake block 68 retracts away from the sprocket and into a rest position. As shown in FIG. 4, the motor support plates 71 extend between the latitudinal support rods 70 while the motor sits directly on the support plates 71 with the provision of perhaps motor mounts thereon to reduce vibration.

FIG. 3 teaches the use of a means for hitching the bicycle to the frame 20, and a first perferred hitch 30 takes the following form. As shown in FIGS. 1 and 3 an arcuate strap 31 extends from the central hub H of the bicycle, the arcuate strap having a curved portion at the trailing end of the bicycle, and a linear portion attached to the axle hub H. Further support is disclosed in the form of struts 32 extending from the the rearward arcuate area 31 up to a topmost portion of the bicycle, thus forming a substantially triangular shaped structure with the fork F of the bicycle in combination with the pair of struts 32 and the arcuate strap 31. An elongate rod 33 extends rearwardly from the terminal portion of the arcuate strap 31, the elongate rod 33 defining a transition from the strap to a ball end 34. Upper and lower socket areas 35 receive the ball end 34 as shown in FIG. 3 in under and overlying relationship respectively, so that upon constriction of the upper and lower socket toward the ball, a supporting joint has been formed having degrees of freedom about three axes. The socket areas can have a bearing surface against the ball end made of teflon or the like to minimize friction and to promote the easy sliding interaction between the ball and the thus formed socket. An increase in tension and pressure in causing the socket areas to come into engagement with the ball is provided by means of a U-shaped spring member 36 formed from two parts, each part being substantially L-shaped and facing each other, each part further being held together by means of a bolt 37 extending through a leg of each L-shaped portion and having a spring 38 on a top face over the bolt 37 and a wing nut 39 whereby the tension on the ball 34 can be altered. The two L-shaped portions forming the U-shaped member 36 have a common base wall 36a defining a doubled over portion, interconnected by means of bolts 37 and nuts N as shown in FIG. 3, the end of the bolt within the U-shaped spring member having plural springs 38 riding thereon. The further springs 38 allow articulation of the two L-shaped base portions one relative to the other to provide greater freedom from unwanted torsion, in the following manner. It is to be noted that the outermost L-shaped portion is affixed and welded to the forwardmost latitudinal brace 25, so that a sudden dip in the road or the like will cause a bending moment about that weld area, which would cause compression of the springs 38 so as to provide further damping. Thus, each of the springs 38 on the hitching area 30 not only provide a positive connection, but also a yielding connection so that the hitching device can absorb shock loads received from all directions.

FIGS. 9 and 10 teach the use of a second perferred form of the hitching device, generally designated as a gimbal type hitch 30'.

The gimbal hitch 30' includes an outer sleeve 1 having on a diametrically opposed extremity a pair of radially outwardly extending spacers 3 terminating in pivot pins 4, the pivot pins 4 adapted to reside within apertures 5 of spaced upper and lower apertures plates 9 as best seen in FIG. 9. Thus, the pivot pin 4 is allowed to reside within the upper and lower apertures 5 and allow swiveling of the outer sleeve 1 as shown. The opposed extremities of each of the upper and lower aperture plates are supported by an interposed pair of columns 8, interconnecting the aperture plates 9 by means of wing nuts N and bolts 6. The lowermost plate 9 is welded to the latitudinal brace 25 as shown. Moreover, an inner sleeve 2 is fixed to remain within the outer sleeve so that longitudinal translation along the length of the outer sleeve is not possible, but rotation thereabout is possible. To this end, a locking cap 6 is provided at an extremity of an inner tube 2 dimensioned to exceed the bore of the outer sleeve 1 so that rotation therewithin is possible. As shown in FIG. 10, the righthand portion of the inner sleeve 2 has spaced first and second plates, which allow the inner sleeve to bifurcate to two portions 2a and 2b (not shown) which attach directly to the hub H of the rear wheel.

As stated above, the power pack 10 includes a motor M which has a very lower center of gravity due to its placement near the rear axle 21 and suspension. FIG. 2 shows on the one side thereof that the drive chain 29 is adapted to communicate with a sprocket hub having a plurality of sprocket teeth of different diameters extending radially outward. Thus, placement of the chain 29 on plural sprockets changes the torque and output of the motor M. In addition, a pulley 13 is disposed on an extremity of the driveshaft associated with the motor M, and the driveshaft pulley 13 is operatively connected to a source of power generation 11 such as an alternator, by means of a belt 12.

FIG. 6 teaches the use of freewheeling device behind the plural concentric stepped sets of sprocket teeth 14 disposed within a housing. A pawl 16 is associated with ratchet teeth 15 on an inner face of the freewheeling housing, operatively engaged by the driveshaft. Reducing the output shaft rpm of the motor while having the wheels W rotate at a comparatively faster rate will cause the sprocket 28 to drive the sprocket set 14 in such a manner that freewheeling means is necessary so as to prevent the engine from braking the momentum of the bicycle and trailer. For example on a downhill run, the ratchet teeth 15 in cooperation with the pawl 16 allow the wheels W and the associated axle 21 and sprocket 28 to run at a greater speed than the motor would normally permit. Thus, an overriding ratchet clutch provides freewheeling.

A centrifugal clutch has also been utilized to harmonize with the ratchet clutch on the same drive shaft, FIGS. 7 and 8 delineate a possible preferred form for such a clutching mechanism. More specifically, an inner drive housing 19a is provided defined by a pair of spaced parallel plates interconnected by means of a plurality of spokes S radially offset from the center of the two plates and equally spaced therefrom. Centrifugal weights 17 are clutch segments having an inner contour adapted to nest upon the interconnecting spokes S joining the two plates 19a, and are constrained in driving relationship therewith by an overlying spring 18. A housing having one open side, an annular ring and a closed side is slidably disposed over the inner drive housing, the outer drive housing 19b adapted to receive the expanding centrifugal clutch weight 17 as they migrate outwardly against spring 18, along an annular inner ring surface of the outer drive housing. Thus, when the rotative speeds are adequate, the inner drive housing is associated with the outer drive housing by the migration of the centrifugal weights outwardly therefrom to effect a graduated rotational uniting and power pack acceleration.

The engine itself is provided with a governor 80 which will now be discussed (FIG. 11).

Air entering into the air induction duct 82 through portal 81 enters into the combustion area C under the influence of the butterfly B which is internal the conduit 82, and operable through a link 84 influenced by leaf 86 and idle adjustment and speed control lever 83. Within the engine compartment, an impellor 87 is shown which provides an air current not only to ventilate the engine, but also to influence a leaf 86 having a pivot hinge 89 about which the leaf 86 rotates. The pivot hinge 89 is formed as an extension of a lever 85 attached to a control rod 84 mounted on the intake passage 82 and operable against biasing by spring 90 whereby motion of the leaf 86 causes motion of the rod 84 through the hinge 89 and lever 85 against the biasing of spring 90, which serves to close the butterfly B so that the limits of speed achieved by the impellor 87 self limits the speed of the engine.

FIG. 12 teaches the use of an instrument control panel in association with handle bars 93 on a conventional bicycle, the handle bars suitably formed to receive a plate 94 thereon, the plate 94 equipped to carry a speedometer 96 provided with illumination means, a horn 91, an engine cutoff 97 and lighting means 95 which serve not only to provide turn signals, but also to illuminate the bike at night in combination with power received from the alternator 11 of FIG. 2. In addition, the cable 88 communicates with a rotatable cylindrical throttle 92 adapted to be manipulated by the hand of the operator so that the throttle of the engine can be thus controlled.

FIG. 1 teaches the use of a carriage or cargo carrier 40 adapted to reside over the engine on top of the frame 20, the carrier including a plurality of downwardly depending legs 41 adapted to rest near the intersection of the longitudinal and latitudinal braces 24,25 by means of lock pins 42 received within bores of the legs 41. The lock pins 42 extend through not only the bores in the legs, but also corresponding bores in the latitudinal brace as shown in the drawings. The upper portion of the carrier 40 includes a lowermost basket 43 defined by a plurality of cross braces forming a web upon which packages and the like can be stored, and a plurality of upwardly extending peripheral rails 44 provide lateral support for cargo carried thereon.

FIG. 5 teaches the use of a control means for providing power and control and the like between the front control panel 94 of the bicycle and the associated hardware, on the power pack 10. More specifically, the struts 32 serve to support joined male and female plug 100 which provides separable connections between the alternator 11 through a plurality of wires 101 that extend between the trailer and the bicycle. Thus, a quick disconnect fastener has been provided for the electrical components extending between the bicycle and the trailer. The cable 88 shown in FIG. 5 is capable of quick separation. More specifically, a shroud 102 is provided which holds one end of the cable 88 proximate the trailer, and a bolt having a nut N releasably constrains the cable 88 thereto. Wing 103 of shroud 102 allows communication of the cable to a pivot lever 104 which is spring biased by means of spring 105 against a housing 106 so that together the three elements pivot lever 104, spring 105 and housing 106 form a triangular structure, the pivot arm 104 capable of translation about its midpoint. The cable 88 which extends to the forward portion of the bike is biased by means of a further spring 107 so that manipulation of the cable within the housing works against pivot element 104 which in turn actuates and energizes the cable 88 running to the engine against the spring pressure 105.

Having thus described the preferred embodiment of the invention, it should be understood that numerous structural modifications and adaptations may be resorted to without departing from the spirit of the invention.

What is claimed is:

1. A device for propelling a bicycle or the like comprising in combination;

a frame having wheels and an overlying cargo carrier means, a power pack disposed thereon adapted to drive said wheels, hitching means directly connecting said frame to the bicycle rearwardly thereof adjacent a rear tire at its trailing portion, and suspension means disposed between said wheels and said frame whereby road irregularities and the like are absorbed by said suspension means and in part by said hitching means, said hitching means providing the bicycle a complete unobstructed total range of motion including allowing the bicycle to lean over completely as when turning wherein said frame is formed by one pair each of longitudinal and latitudinal braces interconnected to form a substantially rectangular grid, a pair of spaced parallel rearwardly extending swing arms resiliently depending via bolt and springs from forward portions of said longitudinal braces, damping means between trailing terminal portions of said swing arms and said longitudinal braces, said wheels carried by said swing arm on an axle wherein said power pack includes freewheeling means to disengage said power pack when the bicycle is moving at an adequate speed including a source of electrical energy coming from said power pack to drive plural electrical assessories on the bicycle and said frame, and male-female plug means to electrically disconnect the bicycle from said frame including a governor on said power pack wherein said power pack is an internal combustion type engine and includes an engine brake for starting comprising a driven sprocket on said axle, a drive chain extending from a drive sprocket on said engine to said driven sprocket, a brake block pivotal from a first position which engages said driven sprocket, thereby retarding its motion, and a second position free of said driven sprocket, and linkage means for moving said brake block from said first to said second positions wherein said cargo carrier means is removable, and includes a plurality of depending leg members fastened to corner areas of said frame, and a basket area defining a horizontal support area having a perimetral wall which overlies said frame wherein said damping means includes first and second springs disposed on opposed sides of said swing arm trailing portion, a resilient plug between said swing arm trailing portion and said longitudinal brace, said plug abutting one of said springs and having a third spring thereover, said springs, swing arm, brace and plug all having a fastening bolt extending therethrough.

2. The device of claim 1 wherein said freewheeling means comprises a pawl and ratchet mounted on an output shaft of said power pack.

3. The device of claim 1 wherein said freewheeling means comprises a centrifugal clutch mounted on an output shaft of said power pack.

4. The device of claim 1 wherein said hitching means comprises an arcuate strap attached to the bicycle, a ball emanating rearwardly therefrom, upper and lower socket areas extending from said frame and adapted to engage said ball, said socket area together forming a U-shaped frame member formed from two L-shaped portions having a common base portions, said base portions being relatively movable against spring means, one said portion welded to said latitudinal brace.

5. The device of claim 1 wherein said hitching means comprises an inner sleeve attached to the bicycle, an outer sleeve means for retaining said inner sleeve within said outer sleeve while still allowing relative rotation, and gimbal means affixing said outer sleeve to said frame.

6. A device for propelling a bicycle or the like comprising in combination;

a frame having wheels and an overlying cargo carrier means, a power pack disposed thereon adapted to drive said wheels, hitching means connecting said frame to the bicycle rearwardly thereof, and suspension means disposed between said wheels and said frame whereby road irregularities and the like are absorbed by said suspension means and a part by said hitching means, said hitching means providing the bicycle a complete normal range of motion wherein said frame is formed by one pair each of longitudinal and latitudinal braces interconnected to form a substantially rectangular grid, a pair of spaced parallel swing arms resiliently depending from forward portions of said longitudinal braces, damping means on trailing portions of said swing arms, said wheels carried by said swing arm on an axle wherein said power pack includes freewheeling means to disengage said power pack when the bicycle is moving at an adequate speed including a source of electrical energy coming from said power pack to drive plural electrical accessories on the bicycle and said frame, and male-female plug means to electrically disconnect the bicycle from said frame including a governor on said power pack wherein said power pack is an internal combustion type engine and includes an engine brake for starting comprising a driven sprocket on said axle, a drive chain extending from a drive sprocket on said engine to said driven sprocket, a brake block pivotal from a first position which engages said driven sprocket, thereby retarding its motion and to a second position free of said driven sprocket, and linkage means for moving said brake block from said first to said second positions wherein said cargo carrier means is removable, and includes:

a plurality of depending leg members fastened to corner areas of said frame, and a basket area defining a horizontal support area having a perimetral wall which overlies said frame wherein said damping means includes first and second springs disposed on opposed sides of said swing arm trailing portion, a resilient plug between said swing arm trailing portion and said longitudinal brace, said plug abutting one of said springs and having a third spring thereover, said springs, swing arm, brace, and plug all having a fastening bolt extending therethrough.

7. The device of claim 6 wherein said freewheeling means comprises a pawl and ratchet mounted on an output shaft of said power pack.

8. The device of claim 6 wherein said freewheeling means comprises a centrifugal clutch mounted on an output shaft of said power pack.

9. The device of claim 6 wherein said hitching means comprises an arcuate strap attached to the bicycle, a ball emanating rearwardly therefrom, upper and lower socket areas extending from said frame and adapted to engage said ball, said socket area together forming a U-shaped frame member formed from two L-shaped portions having a common base portions, said base portions being relatively movable against spring means, one said portion welded to said latitudinal brace.

10. The device of claim 6 wherein said hitching means comprises an inner sleeve attached to the bicycle, an outer sleeve means for retaining said inner sleeve within said outer sleeve while still allowing relative rotation, and gimbal means affixing said outer sleeve to said frame.

* * * * *